June 22, 1965 A. Z. PURZYCKI 3,190,574

TAPE SUPPLY REEL

Filed May 29, 1963

INVENTOR
ALFRED Z. PURZYCKI

BY [signature]
ATTORNEY

United States Patent Office 3,190,574

Patented June 22, 1965

3,190,574
TAPE SUPPLY REEL

Alfred Z. Purzycki, Mount Prospect, Ill., assignor to Teletype Corporation, Skokie, Ill., a corporation of Delaware Filed May 29, 1963, Ser. No. 284,141
2 Claims. (Cl. 242—55)

This invention relates to a reel mechanism for handling large coils of strip material or tape, the outermost convolution of which, as it is being pulled from the reel mechanism, causes the coil of tape to rotate.

With the advent of high speed communications equipment that utilize large amounts of tape and withdraw the tape from a tape reel at high speeds, it is necessary that the tape reel will rotate easily in response to a light pull on the leading end of the tape by a tape utilization device. To this end, roller bearings have been provided in many instances, on a reel hub to reduce the amount of friction between the hub and its supporting spindle, but a large amount of friction still remained due to the fixed reel flanges engaging and rubbing against the sides of the coil of tape, i.e., the edges of the convolutions of tape, as the coil of tape rotates between the flanges.

Accordingly, it is an object of the present invention to reduce the frictional forces tending to prevent the easy rotation of a coil of tape. Another object of the invention is to provide an improved reel mechanism having reel flanges spaced from contact with the coil of tape and having a coil of tape secured in proper position on the hub of the reel mechanism while eliminating large frictional forces on the coil of tape.

An object of the invention is to provide a tape reel mechanism wherein little frictional drag is exerted on the coil of tape to prevent its freely rotating and wherein the hub means is weighted to counterbalance the weight of the hanging and leading end of the tape to prevent the unwinding of the tape from the coil due to the weight of the leading end portion of the tape.

According to the preferred embodiment of the invention the tape reel mechanism has a fixed spindle upon which is mounted a rotatable hub that carries a ball bearing for ease of rotation about the spindle. Mounted on the side walls of the hub are a pair of small slidable latches which may be moved outwardly to a position adjacent a portion of the innermost turns of the coil of tape for the purpose of securing the coil of tape against movement in an axial direction on the tape supply hub. A pair of stationary reel flanges are spaced on either side of the coil of tape and are thereby spaced from frictional engagement with the body of the coil of tape so as not to frictionally retard the rotation of the coil of tape. The flanges function to retain the outermost turn of tape against movement from the outer surface of the coil of tape into a position where it would become entangled about the spindle. A pair of weights are mounted in the hub to unbalance the hub and to prevent continued rotation of the hub and the unwinding of the tape thereon due to the leading end of the tape hanging downwardly from the coil of tape.

The aforementioned and other objects of the invention will become more readily apparent when considered in conjunction with the following detailed description and the drawing wherein.

Figures 1, 2, 3:
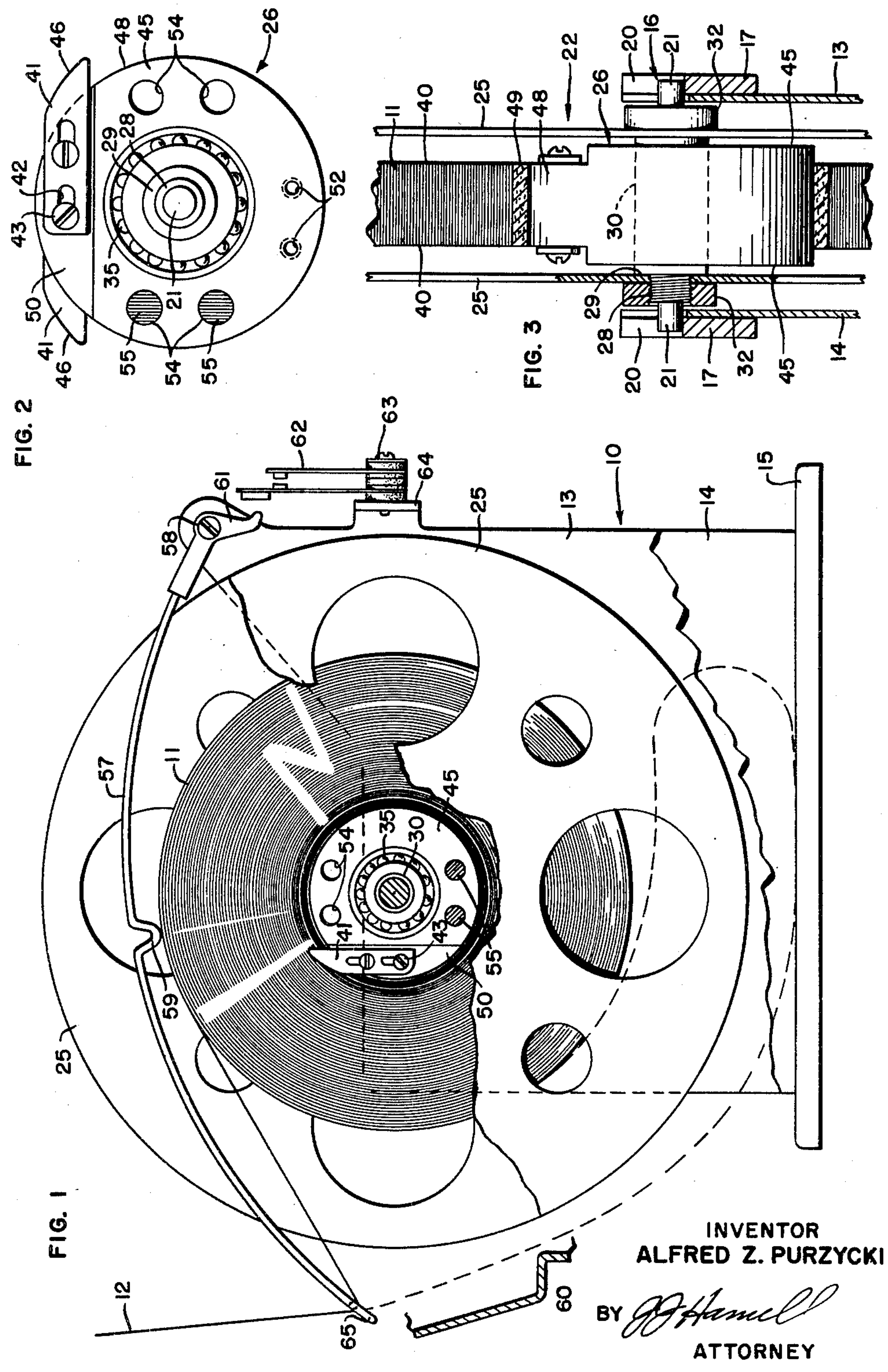
FIG. 1 is a side elevational view of the reel mechanism with one of the supports and one of the reel flanges partially broken away to show the hub of the reel mechanism.
FIG. 2 is an enlarged view of the hub element with the retaining latches thereon.
FIG. 3 is an enlarged sectional view showing the mounting of the reel assembly within supporting stands.

Referring now to the drawings and more particularly to FIG. 1, there is shown a reel mechanism 10 for supporting a coil of tape or strip material 11 that has its leading end 12 extending outwardly to a tape utilization device such as a tape reader or tape punch (not shown). The coil of tape is supported between a pair of upright standards 13 and 14, which are secured to a common base 15, and which function to support a spindle 16 carried by a pair of bearing plates 17 (FIG. 3) that are secured to the upright standards 13 and 14. As should be apparent from FIG. 3, the bearing plates 17 have trunnion slots 20 therein for receiving the stub ends 21 of the spindle 16.

As seen in FIG. 3, the spindle 16 supports a one-piece tape reel assembly 22 that can be lifted from the trunnion slots 20 and removed therefrom when it is desired to exchange coils of tape 11. The tape reel assembly 22 consists essentially of the spindle 16, a pair of spaced flanges 25, a hub 26 and the coil of tape 11 carried by the hub 26. As best seen in FIG. 3 the spindle 16 has a pair of opposed threaded portions 28 which carry the reel flanges 25 that are in engagement with an upstanding shoulder 29 on the spindle 16. The shoulders 29 extend between the threaded portion 28 of the spindle 16 and that portion 30 of the spindle 16 that supports a ball bearing 35 carried by the hub 26. Spacer members 32 are threaded on the threaded portion 28 of the spindle 16 to secure the reel flanges 25 tightly against the shoulders 29 of the spindle 16 so that the flanges 25 are fixed to the spindle 16.

Preferably, the internal bore of the ball bearing 35 is dimensioned slightly larger than the dimension of the supporting portion 30 of the spindle 16 so that reel assembly 22 may be readily passed thereover. Thus, the hub 26 and coil of tape 11 rotate independently of any rotation of the spindle 16 and flanges 25.

When pulling the leading end 12 of the coil of tape 11, the coil of tape 11 and hub 26 will rotate freely about the ball bearing 35 with a minimum of friction. This is of particular importance where paper tape is employed and the coil of tape 11 is large, in which case, the strength of the paper tape is such that it cannot withstand a large pulling force needed to overcome any appreciable friction and the inertia of the coil of tape 11 and the hub 26.

In most prior are reel mechanisms the flanges 25 bear directly against the edges 40 of the coil of tape 11 and thereby constitute an additional force that would have to be overcome before the coil of tape 11 and the hub 26 could be rotated. With the large roll of tape necessary for high speed tape utilization devices, the amount of frictional drag caused by the flanges 25 engaging the edges 40 of the coil of tape 11 rotating at high speeds has been found to be quite significant and has been found to be a significant factor in causing the tape to break when its leading end 12 is pulled by the tape utilization device. The flanges 25 in the present device are spaced from the edges of the tape 40 as seen in FIG. 3 and serve for the most part merely to guide the leading end 12 of the tape and to prevent the leading end of the tape from falling sideward from the outermost convolution of tape 11 to a position where it would become entangled about the hub 26 or spindle 16.

In lieu of holding the coil of tape 11 against axial movement on the hub 26 by conventional reel flanges, the present reel mechanism 10 employs a pair of slidable retaining latches 41 having slots 42 therein for receiving threaded fasteners 43 whereby the retaining latches 41 are secured within cutout portions 50 on each of side walls 45 of the hub 26. As seen in FIG. 2 the retaining latches 41 have been moved outwardly to bring their noses 46 tangentially and radially outward of an outer or circumferential surface 48 on the tape hub 26. As seen in FIG. 3 the coil of tape has a cardboard core 49 for sliding into engagement with the outer surface 48 of the hub 26. The cardboard core 49 is not essential and the coil of tape 11 could be wound so that its innermost convolutions are directly seated on the circumferential surface 48 of the hub 26.

As should be apparent, when placing a coil of tape 11 onto the hub 26, the fasteners 43 are loosened and the slidable retaining latches 41 are moved in a direction to bring their respective noses 46 to within the confines of the outer circumferential surface 48 of the hub 26. After the coil of tape 11 has been positioned on the hub 26, the latches 41 are moved outwardly to bring their noses 46 tangentially and radially outward of the circumferential surface 48 into position adjacent the cardboard core 49, if one is present, and opposite the innermost convolutions of tape wound about the cardboard core 49. Thus, the coil of tape 11 is secured from moving in an axial direction across the outer surface 48 of the hub 26 by these latches 41. It should be noted that the latches 41 engage only a very small area of the total area of side edges 40 of the coil of tape 11 on either side thereof. Hence, the latches 41 will exert only a slight frictional drag on the coil of tape 11 if it moves relative to the surface 48; or if the core 49 is tightly engaged with the outer surface 48, the latches 41 serve merely as a locking means for the coil of tape 11 and there will be no friction between the coil of tape 11 and the latches 41.

As shown in the drawings the latches 41 are carried within cutout portions 50 on the hub 26 and will secure against axial movement any roll of tape 11 that is dimensioned to approximately the same width as the hub 26 is at this point. However, when it is desired to carry a larger roll of tape, for example, one that is approximately the same size as the width of the tape hub 26 where there is no cutout portion 50, the latches 41 may be removed from the cutout portions 50 and may be secured by fasteners 43 threaded in tapped holes 52 in the side walls 45 of the hub 26. With the fasteners 43 in the tapped holes 52 the latches 41 can be utilized in the same manner as they are utilized when the fasteners 43 are secured within the tapped holes (not shown) in the cutout portions 50 of the hub 26.

When accommodating a larger width of tape, the spacer members 32 are moved inwardly of the flanges 25 and abutted against the shoulders 29, the flanges 25 are then spaced between the standards 13 and 14 and the spacers 32 and out of the path of the latches 41 and fasteners 43.

For supporting an intermediate width of tape, one of latches 41 is secured within the cutout 50 and the opposite one of the latches 41 is secured to the side walls 45 of the hub 26 by a fastener 43 in a tapped hole 52. In this instance, the flange 25 adjacent the side wall 45 carrying the latch 41 will be spaced outwardly of the spacer member 32 so as not to interfer with the rotation of the latch 41 and fastener 43 rotating therepast.

The hub 26 is also provided with four bores 54, two of which are filled by weights 55 to unbalance the weight of the hub 26, the hub otherwise being nearly balanced. The weights 55 serve to prevent the spilling off, i.e., the rotation of the spindle and the unwinding of the tape from the coil, due to the weight of the leading end of tape. That is, the weight of the tape hanging downwardly from the roll of tape, when the coil of tape 11 has a small number of remaining convolutions, exerts a sufficient pull on the coil of tape 11 to rotate the coil of tape 11 and the hub 26 to unwind all of the remaining convolutions of tape from the reel unless some preventive measure is taken.

As seen in FIG. 1 there is provided a tape tension arm 57 pivotally mounted on a pin 58 fastened to the standard 13 of the reel mechanism 10. The arm 57 has a bend 59 therein which rides on the outer convolution of tape and acts as a brake on the coil of tape 11 and thereby prevents the spilling off of the tape due to the leading end of the tape hanging downwardly.

The present reel mechanism is mounted in close proximity to a tape utilization device such that a portion of the cabinetry shown in cross-section at 60 limits the counterclockwise rotation of the arm 57 and the braking action thereby at approximately the position when the contact operating arm 61 operates a pair of contacts 62 secured by a fastener 63 to a flange 64 on the standard 13. Thus, as a tape bearing portion 65 of the taut-tape arm 57 moves into engagement with the cabinet 60, the contact arm 61 of the arm 57 moves into engagement with the contact 62 to close these contacts 62 and complete a low-tape alarm circuit signifying that the tape on the coil of tape 11 is almost exhausted.

When the tape bearing portion of the arm 57 engages the cabinet 60, the bent portion 59 will be prevented from engaging the outermost convolutions of the tape coil 11 and hence, will no longer serve as a brake therefor. With few convolutions of tape on the tape hub, the weight of the hanging portion of the leading end 12 of the tape would normally be sufficient to cause the coil of tape 11 and hub 26 to rotate and to unwind all the convolutions from the coil of tape except for the fact that the pair of counterbalancing weights 55 in the hub 56 resist the pull of the leading end of the tape and thereby prevent the rotation of the coil of tape 11. The pair of weights 55 are of a small weight compared to the usual four or five pounds of tape comprising a full coil of tape 11 and hence, so long as the coil of tape 11 is large, the weights 55 do not significantly unbalance the reel assembly 22. Whereas when a large amount of tape has been unwound from the coil of tape 11, the weights 55 are significant with respect to the weight of the remaining convolutions and the weight of the leading end 12 to prevent the spilling off of the tape due to the hanging portion of the leading end of the tape.

From the foregoing, it is believed to be readily apparent that by the use of a pair of slidable retainer latches 41 a large coil of tape 11 can be axially retained on a tape reel without the accompanying frictional drag normally encountered when using reel flanges to prevent axial movement of the coil of tape on the tape reel. Also, from the foregoing it should be apparent that when the usual braking force for a reel of tape is no longer effective that an unbalanced hub 26 can effectively offset a pulling force of a hanging end of the tape tending to rotate the reel assembly 22 and unwind tape from the reel assembly 22.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. In a tape supply reel mechanism for a coil of tape composed of a number of convolutions of tape wound one upon another, the outer convolution of which is adapted to be pulled from the coil of tape to cause the coil of tape to rotate, a frame means for said tape supply reel mechanism, an axle means mounted in said frame means, a hub means carried by said axle means for rotation about said axle means, said hub means supporting the coil of tape for rotation relative to said frame means, brake means for holding said hub means and the coil of tape thereon against rotation by a turning force exerted thereon due to the weight of the leading end of the tape, weight means unbalancing said hub means to hold said hub means and the coil of tape thereon against rotation by a turning force exerted thereon due to the weight of the leading end of the tape when the coil is of a predetermined number of convolutions, said weight means being of such magnitude as to be ineffective to significantly unbalance the full coil of tape to preclude the rotation thereof by the turning force exerted thereon due to the weight of the leading end of the tape, and means for rendering the brake means unoperative when the coil of tape on the hub means becomes nearly exhausted and the coil of tape is reduced to such a size below said predetermined size so as to render the weight means effective to prevent rotation of the coil by the weight of the leading end of the tape.

2. In a tape supply reel mechanism for a coil of tape composed of a number of convolutions of tape wound one upon another, the outer convolution of which is adapted to be pulled from the coil of tape to cause the coil of tape to rotate;

a frame means for said tape supply reel mechanism, an axle means mounted in said frame means, a hub means carried by said axle means for rotation about said axle means, said hub means supporting the coil of tape for rotation relative to said frame means, and retaining means slidably mounted on said hub means for outward movement from the circumferential surface of said hub means to a position opposite the edges of the innermost convolutions of tape on the tape reel;

said hub means having first end surfaces in planes normal to its axis and spaced apart a distance equal to the width of a first predetermined width of tape for supporting said retaining means in a position to hold said first width of tape therebetween and having at least one other end surface also in a plane normal to its axis and spaced from one of the first end surfaces a distance equal to the width of a second narrower predetermined width of tape for supporting said retaining means in a position to hold said second width of tape therebetween.

References Cited by the Examiner

UNITED STATES PATENTS

| | | | |
|---|---|---|---|
| 970,150 | 9/10 | Williams | 242—55.2 |
| 1,763,861 | 6/30 | Peterson | 242—129.7 |
| 1,919,607 | 7/33 | Thompson | 242—57 X |
| 2,384,637 | 9/45 | Owens | 242—71.2 |
| 2,622,814 | 12/52 | Benke | 242—55.2 |
| 2,663,514 | 12/53 | McArthur | 242—56 |
| 2,713,462 | 7/55 | Camras | 242—68.3 |

FOREIGN PATENTS

| | | |
|---|---|---|
| 792,613 | 10/35 | France. |

MERVIN STEIN, *Primary Examiner.*